(12) United States Patent
Saitoh et al.

(10) Patent No.: US 10,578,921 B2
(45) Date of Patent: Mar. 3, 2020

(54) BRIGHTNESS HOMOGENIZING MEMBER, BACKLIGHT UNIT, AND LIQUID CRYSTAL DISPLAY DEVICE

(71) Applicant: FUJIFILM Corporation, Tokyo (JP)

(72) Inventors: Yukito Saitoh, Kanagawa (JP); Naoyoshi Yamada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/546,885

(22) Filed: Aug. 21, 2019

(65) Prior Publication Data
US 2019/0377228 A1 Dec. 12, 2019

Related U.S. Application Data

(63) Continuation of application No. PCT/JP2018/005285, filed on Feb. 15, 2018.

(30) Foreign Application Priority Data

Feb. 27, 2017 (JP) .................. 2017-034542
Aug. 10, 2017 (JP) .................. 2017-155460

(51) Int. Cl.
*G02F 1/1335* (2006.01)
(52) U.S. Cl.
CPC .. *G02F 1/133611* (2013.01); *G02F 1/133603* (2013.01); *G02F 1/133605* (2013.01);
(Continued)

(58) Field of Classification Search
CPC ......... G02F 1/133611; G02F 1/133615; G02F 1/133605; G02F 1/133603;
(Continued)

(56) References Cited

U.S. PATENT DOCUMENTS

2006/0007302 A1* 1/2006 Numata ............ G02F 1/133524
348/71
2006/0221592 A1 10/2006 Nada et al.
(Continued)

FOREIGN PATENT DOCUMENTS

JP 2006-286906 A 10/2006
JP 2007-004104 A 1/2007
(Continued)

OTHER PUBLICATIONS

International Search Report issued in PCT/JP2018/005285 dated Mar. 20, 2018.
(Continued)

*Primary Examiner* — Shan Liu
(74) *Attorney, Agent, or Firm* — Edwards Neils LLC; Jean C. Edwards, Esq.

(57) ABSTRACT

A brightness homogenizing member comprising: an incidence surface and an emission surface, the brightness homogenizing member has a lamination structure in which the brightness homogenizing member has a layer of high refractive index and a layer of low refractive index are alternately laminated in a direction perpendicular to the emission surface, each of a plurality of the layers of high refractive index includes, on a light emission surface side, a light bending portion that bends at least a portion of light proceeding in a direction intersecting to the emission surface and cause the light to proceed in a direction in which an in-plane component parallel to the emission surface increases, in a case where the lamination structure is planarly viewed from a lamination direction in the lamination structure, the light bending portions are provided in different positions between the plurality of the layers of high refractive index.

11 Claims, 9 Drawing Sheets

(52) U.S. Cl.
CPC .. *G02F 1/133606* (2013.01); *G02F 1/133615* (2013.01); *G02F 2001/133607* (2013.01)

(58) Field of Classification Search
CPC ... G02F 1/133606; G02F 2001/133607; G02F 1/1336; G02F 2001/133616; G02F 1/133504; G02F 1/133308; G02F 2001/133317; G02F 2001/133322; G02B 6/0088; G02B 6/005; G02B 6/0068; G02B 6/0073; G02B 6/0083
USPC ...................................................... 349/61–64
See application file for complete search history.

(56) References Cited

U.S. PATENT DOCUMENTS

| | | | |
|---|---|---|---|
| 2007/0247567 | A1 | 10/2007 | Sato et al. |
| 2008/0030649 | A1* | 2/2008 | Choi ...................... G02B 5/021 349/64 |
| 2014/0133177 | A1* | 5/2014 | Miller .................... G02B 6/005 362/607 |
| 2015/0293273 | A1* | 10/2015 | Chen ..................... G02B 5/0278 362/355 |

FOREIGN PATENT DOCUMENTS

| | | |
|---|---|---|
| JP | 2012-242764 A | 12/2012 |
| JP | 2013-058318 A | 3/2013 |

OTHER PUBLICATIONS

Witten Opinion issued in PCT/JP2018/005285 dated Mar. 20, 2018.
International Preliminary Report on Patentability issued by WIPO dated Aug. 27, 2019 in connection with International Patent Application No. PCT/JP2018/005285.

\* cited by examiner

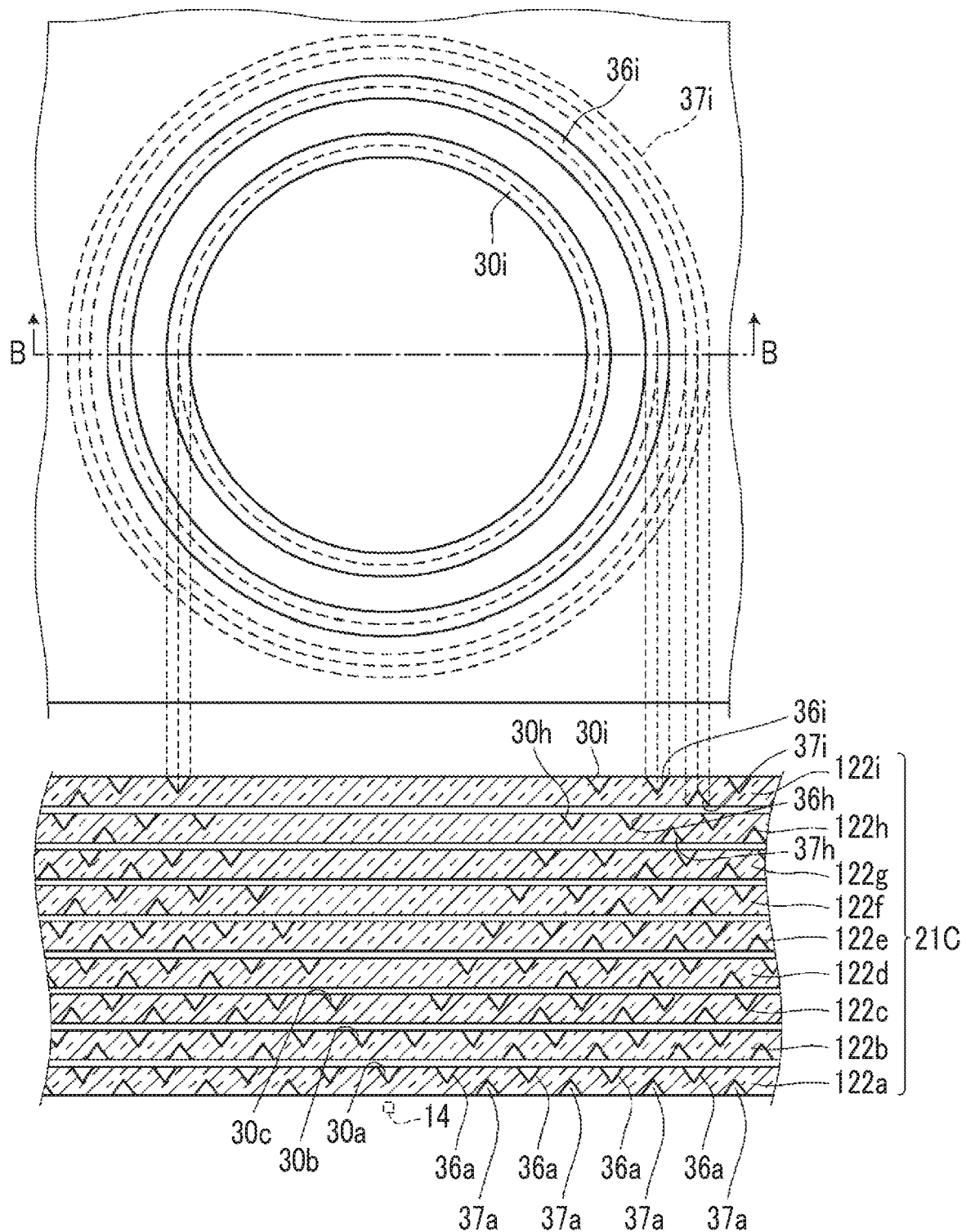

BRIGHTNESS HOMOGENIZING MEMBER, BACKLIGHT UNIT, AND LIQUID CRYSTAL DISPLAY DEVICE

CROSS-REFERENCE TO RELATED APPLICATIONS

This application is a continuation application of International Application No. PCT/JP2018/005285, filed Feb. 15, 2018, which was published under Article 21(2) in Japanese, and which claims priority under 35 U.S.C. § 119(a) to Japanese Patent Application No. 2017-034542, filed Feb 27, 2017, and Japanese Patent Application No. 2017-155460, filed Aug. 10, 2017. The above applications are hereby expressly incorporated by reference, in their entirety, into the present application.

BACKGROUND OF THE INVENTION

1. Field of the Invention

The present invention relates to a brightness homogenizing member included in a backlight unit of a liquid crystal display device, a backlight unit, and a liquid crystal display device using these.

2. Description of the Related Art

A liquid crystal display device expands applications thereof as an image display device that has low power consumption and saves spaces. For example, the liquid crystal display device is formed by providing a backlight unit, a backlight side polarizing plate, a liquid crystal panel, a viewing side polarizing plate, and the like in this order.

As a backlight unit, for example, there are known an edge light type (also referred to as side light) that includes a light guide plate and a light source disposed on the end face thereof, guides light incident from the light source on the end face, and applies the light from the entire main surface toward the liquid crystal panel and a direct type in which a light source is disposed immediately below a liquid crystal panel without using a light guide plate and which applies light toward the liquid crystal panel from the entire main surface of the light diffusion plate or the optical sheet.

The light diffusion plate is disposed for the purpose of reducing brightness unevenness (unevenness in in-plane brightness) in the plane of the emitted light by diffusing the light from the light source or the light passing through the light guide plate. In recent years, light emitting diode (LED) light sources are mainly used according to demand for power saving and miniaturization, but since the LED light sources have strong directivity, particularly in the case of direct type, a portion immediately above the LED is very bright, noticeable brightness unevenness occurs. Therefore, in order to obtain irradiation light with little luminance unevenness over the entire light emitting surface, it is necessary to sufficiently separate the distance between the light diffusion plate and the LED light source, and thus it is difficult to sufficiently reduce a thickness.

JP2006-286906A discloses a processed portion that adjusts the proceeding direction of light from the LED immediately above the LED as a method of relaxing the directivity of the LED light to suppress contrast in a case of used as a light source of a direct type backlight. JP2012-242764A discloses using a light diffusion plate having a recessed part in the shape of a polygonal pyramid or a truncated pyramid and having the surface having the recessed part as an emission surface for the purpose of eliminating uneven brightness in a direct type backlight unit.

SUMMARY OF THE INVENTION

FIG. 11 is a view schematically illustrating a backlight unit including point light sources 14 including LEDs and a light diffusion plate 29. As illustrated in FIG. 11, the light diffusion plate 29 is a plate in which scattering particles 28 are dispersed and included throughout the entire area. As illustrated in FIG. 11, in a case where light from the point light source 14 is directly incident on one surface of the light diffusion plate 29, the brightness distribution in a light emission surface 29b of the light diffusion plate 29 is schematically illustrated in FIG. 12. In the light diffusion plate 29, it is possible to scatter incident light at various angles, but it is difficult to sufficiently spread the light in the in-plane direction, the brightness is high at the light source position, and, as it goes farther from the light source, the brightness becomes smaller, such that the uniformity of the brightness in the plane is low. As the distance between the point light sources 14 and the light diffusion plate 29 is reduced, the unevenness of the brightness becomes more noticeable.

The unevenness of the brightness tends to be improved by the configurations suggested in JP2006-286906A and JP2012-242764A, but the in-plane brightness uniformity in a case where the thickness is further reduced is not yet sufficient. In a case where the in-plane brightness uniformity of the backlight on the light emission surface of the backlight unit cannot be sufficiently reduced, it is necessary to dispose the backlight units so as to sufficiently space a distance between the light emitting surface of the backlight unit and the liquid crystal panel such that the backlight is sufficiently diffused to be incident on the liquid crystal panel with even brightness, and thus it is difficult to reduce the thickness of the liquid crystal display device.

In view of the above, an object of the present invention is to provide a brightness uniforming member that is capable of being used as a diffusion plate of a backlight unit and realizes further thinning of the backlight unit and the liquid crystal display device. Another object of the present invention is to provide a backlight unit and a liquid crystal display device that include a brightness homogenizing member.

A brightness homogenizing member comprising: an incidence surface on which light from a plane light source is incident; and an emission surface that is at an opposite side of the brightness homogenizing member from the incidence surface, and that emits light, in which the brightness homogenizing member homogenizes brightness of the light from the plane light source and emits the light, the brightness homogenizing member has a lamination structure in which layers of high refractive index having a relatively high refractive index and layers of low refractive index having a relatively low refractive index are alternately laminated in a direction perpendicular to the emission surface, each of a plurality of the layers of high refractive index includes, on a surface on an emission surface side, a light bending portion that bends at least a portion of light proceeding in a direction intersecting the emission surface and causes the light to proceed in a direction in which an in-plane component parallel to the emission surface increases, and in a case in which the lamination structure is planarly viewed from a lamination direction in the lamination structure, the light bending portions are provided in different positions between the plurality of the layers of high refractive index.

Here, the plane light source may be a plane light source that outputs light in a two-dimensionally spreading region, and for example, a plurality of point light sources are two-dimensionally arranged on a substrate.

A "layer of high refractive index having a relatively high refractive index" and a "layer of low refractive index having a relatively low refractive index" mean that the layer of high refractive index has a refractive index higher than the refractive index of the layer of low refractive index. A lamination structure in which the layers of high refractive index and the layers of low refractive index are alternately laminated is a structure of at least including the plurality of layers of high refractive index.

The expression "in a case where the lamination structure is planarly viewed from a lamination direction in the lamination structure, the light bending portions are provided in different positions between the plurality of the layers of high refractive index" means a state in which it is not necessary that all the light bending portions in the lamination structure are at positions different from each other, but in a case where the total area of the light bending portion existing in the lamination structure in a case being planarly viewed is less than 100% of the area of the emission surface, 80% or more of the total number of the light bending portions in the lamination structure is in positions different from each other (not overlapped). In a case of being planarly viewed in the lamination direction, the light bending portions provided in the layer of high refractive index are preferably not overlapped with light bending portions provided in another layer of high refractive index but may be overlapped with the light bending portions.

In the brightness homogenizing member according to the embodiment of the present invention, each layer of the plurality of the layers of high refractive index includes a plurality of the light bending portions, and in a case of being planarly viewed, a sum of areas occupied by the light bending portions in each layer is 5% to 20% of an area of the emission surface.

It is preferable that, in the brightness homogenizing member according to the embodiment of the present invention, in a case of being planarly viewed, an area occupied by the light bending portions existing in the lamination structure is 30% or more of an area of the emission surface.

It is preferable that in the brightness homogenizing member according to the embodiment of the present invention, the light bending portion is constituted with a reflective surface provided not parallel to the emission surface.

The light bending portion may include a hemispherical, conical, or polygonal pyramidal recessed part provided on the emission surface side of the layer of high refractive index.

The light bending portion may include a reflective surface provided on a surface on the emission surface side and a light scattering portion provided adjacent to the reflective surface.

The light bending portion may include a cholesteric liquid crystal dot provided on a surface on the emission surface side.

The light bending portion may be a diffraction lattice provided on a surface on the emission surface side.

A backlight unit according to the embodiment of the present invention comprises: a plane light source; and the brightness homogenizing member according to the embodiment of the present invention which is disposed on a light emission surface side of the plane light source.

In the backlight unit according to the embodiment of the present invention, the plane light source includes a plurality of point light sources two-dimensionally arranged, and light from the point light sources is directly incident on the incidence surface of the brightness homogenizing member.

A liquid crystal display device according to the embodiment of the present invention comprises: a liquid crystal display element; and the backlight unit according to the embodiment of the present invention.

Since a brightness homogenizing member according to the embodiment of the present invention comprising: an incidence surface on which light from a plane light source is incident; and an emission surface that is at an opposite side of the brightness homogenizing member from the incidence surface, and that emits light, in which the brightness homogenizing member homogenizes brightness of the light from the plane light source and emits the light, the brightness homogenizing member has a lamination structure in which a layer of high refractive index having a relatively high refractive index and a layer of low refractive index having a relatively low refractive index are alternately laminated in a direction perpendicular to the emission surface, a plurality of the layers of high refractive index respectively include, on the light emission surface side, light bending portions that bend at least a portion of light proceeding in a direction of intersecting the emission surface and cause the light to proceed in a direction in which an in-plane component parallel to the emission surface increases, and in a case in which the lamination structure is planarly viewed from a lamination direction in the lamination structure, the light bending portions are provided in different positions between the plurality of the layers of high refractive index, while an area proportion of the light bending portion with respect to the emission surface is increased, an area proportion of the light bending portions provided in one layer of high refractive index can be decreased. With such a configuration, the spread of light in the in-plane direction can be improved in the layer of high refractive index, and as a result, the uniformity of in-plane brightness of output light can be improved.

In the backlight unit having the brightness equalizing member, high in-plane brightness can be homogenized, and thus the thickness can be reduced as a whole.

BRIEF DESCRIPTION OF THE DRAWINGS

FIG. 6C is a schematic plan view and a schematic cross sectional view illustrating the brightness homogenizing member of Design Modification Example 2.

DESCRIPTION OF THE PREFERRED EMBODIMENTS

Hereinafter, embodiments of a brightness homogenizing member, a backlight unit, and a liquid crystal display device according to the embodiment of the present invention will be described in detail with reference to the drawings.

According to the present specification, unless described otherwise, the numerical range expressed by using "to" means a range including numerical values described before and after "to" as a lower limit value and an upper limit value.

Figure 1:
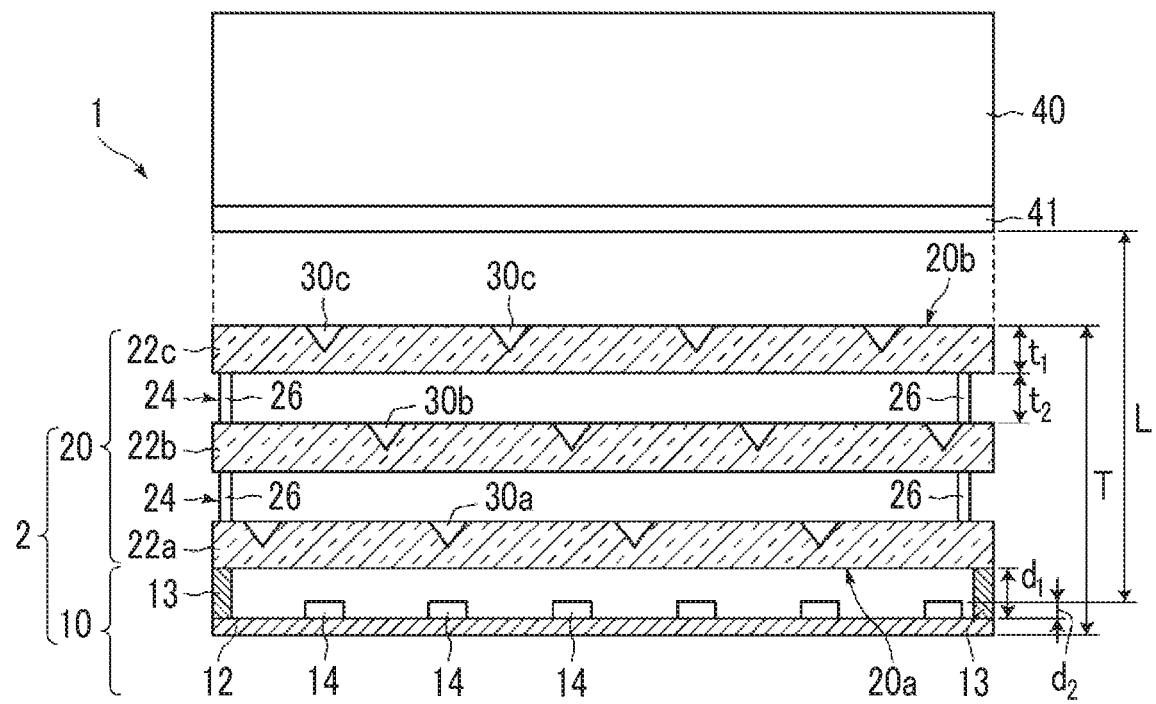
FIG. 1 is a schematic cross sectional view illustrating a schematic configuration of a liquid crystal display device according to an embodiment of the present invention.

FIG. 1 is a cross sectional view illustrating a schematic configuration of a liquid crystal display device 1 according to an embodiment of the present invention.

The liquid crystal display device 1 includes a liquid crystal display element 40 on which the backlight is incident from a backlight incidence surface opposite to an image display surface, and a backlight unit 2 according to the first embodiment of the present invention that is disposed on a backlight incidence surface side of the liquid crystal display element 40. The backlight unit 2 includes a plane light source 10 and a brightness homogenizing member 20 according to the first embodiment of the present invention.

The liquid crystal display element 40 includes a liquid crystal panel, a viewing side polarizing plate provided on the viewing side thereof, and a backlight side polarizing plate provided on the backlight side. An element that is disposed on a most backlight unit side among elements constituting the liquid crystal display element 40 in the present example is a prism sheet 41. However, a member that is disposed immediately below the backlight unit is not limited to the prism sheet, and examples thereof include a diffusion sheet, a brightness enhancement sheet, a polarizing plate, and a liquid crystal cell.

Figure 2:
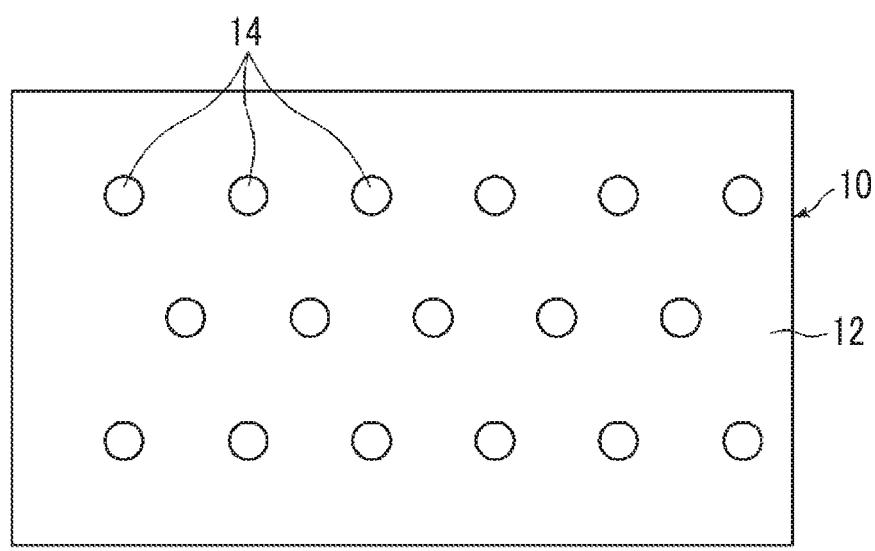
FIG. 2 is a schematic plan view illustrating a plane light source used in the liquid crystal display device of FIG. 1.

The plane light source 10 according to the present embodiment is a direct type plane light source in which point light sources 14 such as LEDs are two-dimensionally arranged on a reflective plate 12. FIG. 2 is a schematic plan view illustrating the plane light source 10. The point light sources 14 as illustrated in FIG. 2 are evenly disposed on the reflective plate 12 at predetermined intervals vertically and horizontally. The brightness homogenizing member 20 is provided on side walls 13 that are provided on peripheral edges of a substrate and have reflective surfaces inside. In the present configuration, the height of the side wall 13 defines a distance $d_1$ between the reflective plate 12 on which the point light sources 14 are provided and the brightness homogenizing member 20. The distance $d_1$ is preferably 0.5 mm to 5 mm, in view of thinning.

Thicknesses $d_2$ of the point light sources 14 are different depending on the types of the point light sources, but it is desirable that $d_2$ is short in view of thinning, and is preferably 0.2 mm to 5 mm and more preferably 0.2 mm to 1 mm.

The point light source may be LED or may be a laser light source. A laser light source is preferable since color reproducibility is improved and light can more efficiently spread in the in-plane direction. The light source may be a white light source, or a plurality of light sources of different emission colors may be used.

Although the substrate on which the point light sources 14 are disposed is not limited to the reflective plate, it is preferable to provide the reflective plate 12 in order to increase utilization efficiency of light and improve brightness by further reflecting light reflected by the brightness homogenizing member 20 among light emitted from the point light source 14 to the brightness homogenizing member 20. The reflective plate 12 is not particularly limited, and various kinds of well-known reflective plates can be used. In order to efficiently use light, it is preferable to have a reflective face having low absorption and high reflectance. For example, it is preferable to have a reflective face made of a multilayer film using white PET or a polyester-based resin, but the present invention is not limited thereto. Examples of the multilayer film using a polyester-based resin include ESR (trade name) manufactured by the 3M Company.

The direct type backlight unit in the related art comprises a light diffusion plate for diffusing light from a point light source, but the present backlight unit 2 comprises the brightness homogenizing member according to the embodiment of the present invention instead of the light diffusion plate.

In the liquid crystal display device 1, light emitted from the point light source 14 of the backlight unit 2 is incident from an incidence surface 20a thereof on the brightness homogenizing member 20 and output from an emission surface 20b in a state in which the in-plane brightness is homogenized in the brightness homogenizing member 20. That is, the backlight having high in-plane uniformity output from the backlight unit 2 can be caused to be incident on the backlight incidence surface of the liquid crystal display element 40.

The brightness homogenizing member 20 according to the present embodiment is specifically described.

The brightness homogenizing member 20 is a planar member comprising the incidence surface 20a on which light emitted from the plane light source 10 is incident; and the emission surface 20b that is at an opposite side of the brightness homogenizing member from the incidence surface 20a, and that emits light and that emits light by homogenizing in-plane brightness of the light from the plane light source 10.

The brightness homogenizing member 20 has a lamination structure in which layers of high refractive index 22

(22*a*, 22*b*, 22*c*) having relatively high refractive indexes and layers of low refractive index 24 having relatively low refractive indexes are alternately laminated on the emission surface 20*b* in a vertical direction. In the present example, three layers of the layers of high refractive index 22 are provided in the lamination structure. Hereinafter, in a case where it is necessary to distinguish respective layers of a plurality of the layers of high refractive index 22, the layers are denoted as "the layers of high refractive index 22*a*, 22*b*, 22*c*, . . . ", and in a case where it is not necessary to distinguish the layers, the layers are simply denoted as "the layers of high refractive index 22".

In the interface between the layer of high refractive index 22 and the layer of low refractive index 24, in order to totally reflect more light incident on the interface from the layer of high refractive index 22 side, the difference between refractive indexes of the layer of high refractive index 22 and the layer of low refractive index 24 is preferably 0.2 or more.

Materials for constituting the layer of high refractive index and the layer of low refractive index are not particularly limited, as long as the layer of high refractive index has a refractive index higher than that of the layer of low refractive index. The layer of low refractive index 24 is most preferably an air layer. At this point, the layer of high refractive index 22 may have a refractive index higher than that of the air layer, and various kinds of well-known plate-like materials (sheet-like materials) can be used. Examples thereof include an acrylic resin such as polyethylene terephthalate, polypropylene, polycarbonate, and polymethyl methacrylate, and cellulose acylate such as benzyl methacrylate, a MS resin (polymethacrylic styrene), a cycloolefin polymer, a cycloolefin copolymer, cellulose diacetate, and cellulose triacetate, and the layer may be formed of a highly transparent resin, as in the light guide plate used in a known backlight device. The resin is not limited to a thermoplastic resin, and for example, an ionizing radiation curable resin such as an ultraviolet curable resin or an electron beam curable resin, or a thermosetting resin can also be used. In a case where the layer of low refractive index 24 is an air layer, it is necessary that the refractive index of the layer of high refractive index 22 is higher than that of the air.

The layer of high refractive index 22 is suitably a sheet made of a resin.

The thickness ti of the layer of high refractive index 22 is preferably 2 µm to 20 µm.

As illustrated in FIG. 1, a spacer 26 may be disposed such that the layers of high refractive index 22 are not in contact with each other. The thickness (gap between the layers of high refractive index 22) $t_2$ of the layer of low refractive index 24 may be small, and the thickness is preferably more than 0 µm and 10 µm or less.

In a case where the thickness is caused to be in the range of the above film thickness, the thickness T as the backlight unit can be suppressed to be about 1 to 5 mm, and can be applied to a thin liquid crystal display device such as a smart phone or a tablet PC.

As described above, the backlight unit in the related art is disposed to be spaced from the liquid crystal display element 40 in order to cause the light emitted from the backlight unit to be sufficiently diffused and to be incident on the liquid crystal display element 40 with even brightness. According to the present embodiment, by providing the brightness homogenizing member 20, the uniformity of the brightness of the backlight can be sufficiently increased, and the gap between the liquid crystal display element 40 and the backlight unit can be narrowed down, so as to achieve further thinning of the liquid crystal display device.

The plurality of layers of high refractive index 22*a*, 22*b*, and 22*c* respectively comprise light bending portions 30 (30*a*, 30*b*, and 30*c*) that bend at least a portion of the light proceeding in a direction of intersecting with the emission surface 20*b*, on the surface of the emission surface 20*b* and causes the light in a direction in which an in-plane component parallel to the emission surface 20*b* increases. Hereinafter, in a case where it is necessary to distinguish the light bending portions 30 included in the layers of high refractive index 22*a*, 22*b*, and 22*c*, the light bending portions 30 are denoted as "the light bending portion 30*a*, 30*b*, 30*c*, . . . ". Details of the light bending portion 30 are described below, but the light bending portion 30 according to the present embodiment is formed with a recessed part provided in a quadrangular prism shape. Here, the light proceeding in a direction intersecting to the emission surface 20*b* refers to light having a component in a direction perpendicular to the emission surface 20*b*.

Figure 3A:
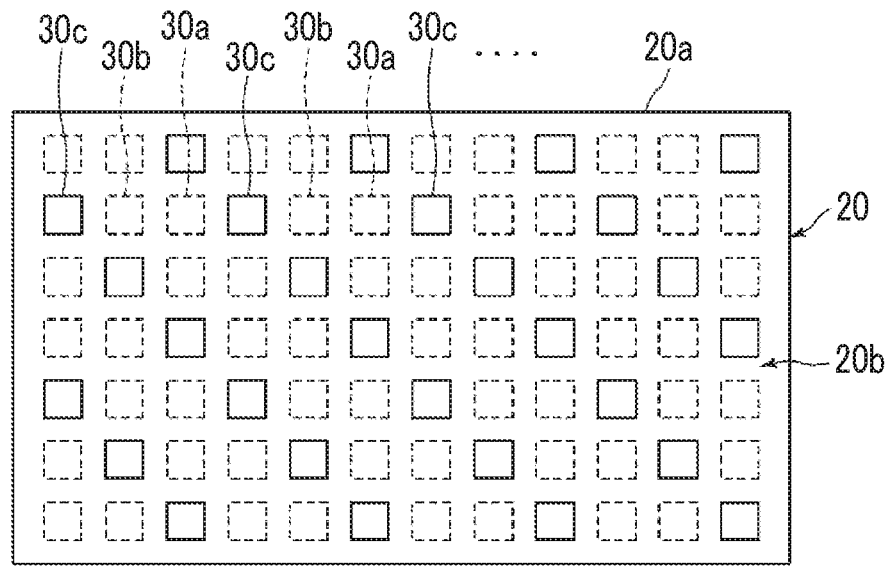
FIG. 3A is a schematic plan view illustrating a brightness homogenizing member according to a first embodiment of the present invention.

FIG. 3A is a schematic plan view illustrating the brightness homogenizing member 20. As illustrated in 3A, the light bending portions 30 are provided at positions different from each other between the plurality of layers of high refractive index 22 in a case where the lamination structure is planarly viewed from a lamination direction in the lamination structure. That is, the light bending portion 30*a* of the layer of high refractive index 22*a*, the light bending portion 30*b* of the layer of high refractive index 22*b*, and the light bending portion 30*c* of the layer of high refractive index 22*c* are disposed at position deviated from each other in a case of being planarly viewed in the lamination structure. In FIG. 3A, all of the light bending portions 30 provided in the respective layers of high refractive index 22*a*, 22*b*, and 22*c* are provided without being overlapped with each other in the lamination direction. However, the light bending portions 30 that are provided in the different layers of high refractive index 22 may be partially overlapped with each other.

As the backlight unit 2, it is preferable that the point light sources 14 in the plane light source 10 are overlapped with any one of the light bending portions 30 in the lamination structure in a plan view, in view of effectively achieving brightness homogenization.

Figure 3B:
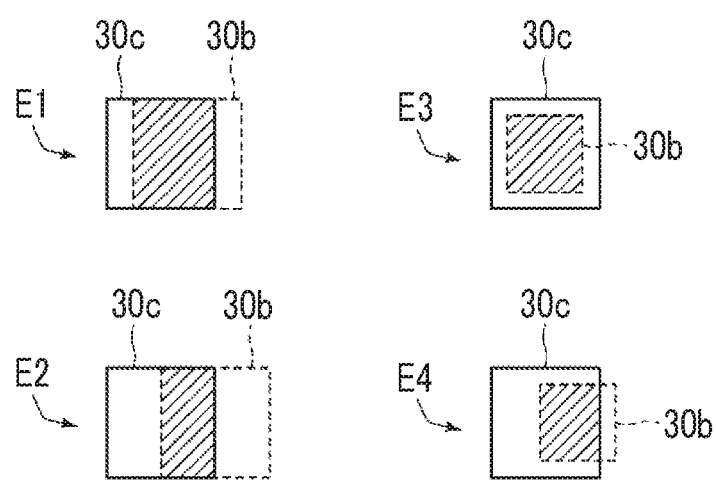
FIG. 3B is schematic views for describing position relationships of light bending portions provided on different layers of high refractive index in a lamination direction.

FIG. 3B is schematic views for describing position relationships of light bending portions provided on different layers of high refractive index in a lamination direction. Here, overlapping states of the light bending portions 30*c* and 30*b* respectively provided on the layer of high refractive index 22*c* and the layer of high refractive index 22*a* are illustrated as examples.

The size of the plurality of light bending portions in one brightness homogenizing member may be identical to or different from each other. E1 and E2 of FIG. 3B indicate cases where the sizes (area in a plan view) of the light bending portions 30*c* and 30*d* are identical to each other, and E3 and E4 of FIG. 3B indicate cases where the size of the light bending portion 30*c* is larger than that of the light bending portion 30*d*. Hereinafter, the area of the light bending portion in a plan view is simply referred to as an area of the light bending portion. As illustrated in E1 and E2 of FIG. 3B, the light bending portions 30*c* and 30*b* having the same size may be disposed in a partially overlapped manner. Here, as in E1 of FIG. 3B, an area in an overlapped portion indicated by diagonal lines is 90% or more of the area of one light bending portion 30, it is considered that the light bending portions 30*c* and 30*b* coincide with each other in the lamination direction. Meanwhile, as in E2 of FIG. 3B, an area in an overlapped portion indicated by diagonal lines is less than 90% of the area of one light bending portion 30, and it is considered that the light bending portions 30c and 30b are disposed at positions different from each other.

As illustrated in E3 and E4 of FIG. 3B, in a case where one light bending portion 30c is larger than the other light bending portion 30b, the area of the smaller light bending portion 30b is considered as a standard. In a case where the light bending portion 30b is overlapped with the light bending portion 30c by 90% or more of the size, it is considered that the state is a coincident state, and in a case where the area of the overlapped portion is less than 90% of the area of the light bending portion 30b, it is considered that the light bending portion 30b and the light bending portion 30c are disposed at different positions in a plan view.

The area of the light bending portion 30 in a plan view is preferably 1 µm² to 25 mm². It is preferable that the circle equivalent diameter of the area of the light bending portion 30 is longer than the wavelength of visible light, since interference is not generated, and it is more preferable that the circle equivalent diameter is 1 µm or more. As described above, areas of the plurality of light bending portions in one lamination structure may be different from each other, but in view of ease of the manufacturing, it is preferable that all are identical to each other.

Figure 4A:
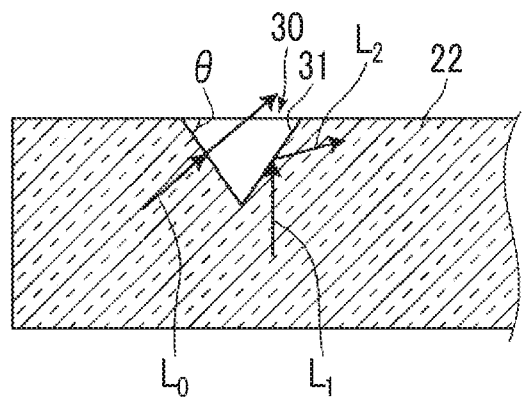
FIG. 4A is an enlarged cross sectional view illustrating a light bending portion in the brightness homogenizing member according to the first embodiment of the present invention.

FIG. 4A is an enlarged cross sectional view illustrating the light bending portion 30 provided on the light emission surface side of the layer of high refractive index 22. The light bending portion 30 in the present example is a quadrangular pyramidal recessed part which is formed on one surface of the layer of high refractive index 22. A surface 31 constituting the recessed part is a surface that is provided so as to be not parallel to the emission surface 20b (see FIG. 1), and functions as a reflective surface that constitutes an interface between the layer of high refractive index 22 and the air layer and totally reflects light incident at an angle of a critical angle or more. Light $L_1$ that proceeds in a direction intersecting to the emission surface 20b in the layer of high refractive index 22 becomes light $L_2$ that is incident and totally reflected on the surface 31 at an incidence angle of the critical angle or more and proceeds in a direction in which the in-plane component parallel to the emission surface increases compared with the original light $L_1$. In this manner, the light bending portion 30 exhibits a function of bending, to an in-plane direction of the layer of high refractive index 22, a direction of proceeding the light $L_1$ that is not totally reflected and is transmitted by the layer of high refractive index 22 because of being incident on the interface between the layer of high refractive index 22 and the layer of low refractive index 24 at an angle smaller than a critical angle, so as to propagate inside the layer of high refractive index 22 and expand in the in-plane direction.

Even in a case where the light is incident from the layer of high refractive index 22 to the surface 31 of the light bending portion 30 and proceeds in a direction of intersecting to the emission surface 20b, the light Lo that incident to the surface 31 at an incidence angle smaller than the critical angle transmits the surface 31. An angle θ that is formed with the surface of the layer of high refractive index 22 of the surface 31 is preferably about 30° to 60°. The area of the light bending portion 30 is identical to the area of the bottom surface of a quadrangular pyramid forming a recessed part.

In the present example, the recessed part has a quadrangular pyramidal shape, the shape of the recessed part is not limited thereto, and may be a hemispherical shape, a conical shape, a polygonal pyramid shape, a truncated cone shape, a polygonal truncated pyramid shape, or the like. In any case, as long as the recessed part has a shape including a surface provided to not be parallel to the emission surface 20b, and similar effects can be obtained.

In one of the layer of high refractive index 22, the plurality of light bending portions 30 are disposed in a dispersed manner. At this point, in a case where the light bending portions 30 are disposed to be adjacent to each other in one layer of high refractive index 22, the light that is bent on one light bending portion 30 and proceeds in the in-plane direction bends in the adjacent light bending portion 30 is emitted from the layer of high refractive index 22, such that the light does not sufficiently expand in the in-plane direction in some cases, but in a case where the light bending portions 30 are disposed in one layer of high refractive index 22 in a sufficiently spaced manner, the incident light sufficiently expands in the in-plane direction inside the layer of high refractive index 22, the effect of homogenizing brightness can be increased. In one layer of high refractive index 22, the sum of the areas of the plurality of light bending portions 30 is preferably 5% to 20% of the area of the emission surface 20b.

In the brightness homogenizing member 20, in a case where a lamination structure including the plurality of layers of high refractive index 22 is planarly viewed from the emission surface 20b side, a proportion of an area of the light bending portion 30 existing in the lamination structure to an area of the emission surface 20b is preferably 30% or more, more preferably 50% or more, and particularly preferably 80% or more. It is most preferable that the proportion area occupying the light bending portion 30 to the area of the emission surface 20b is 100%, in view of homogenizing brightness.

Figure 4B:
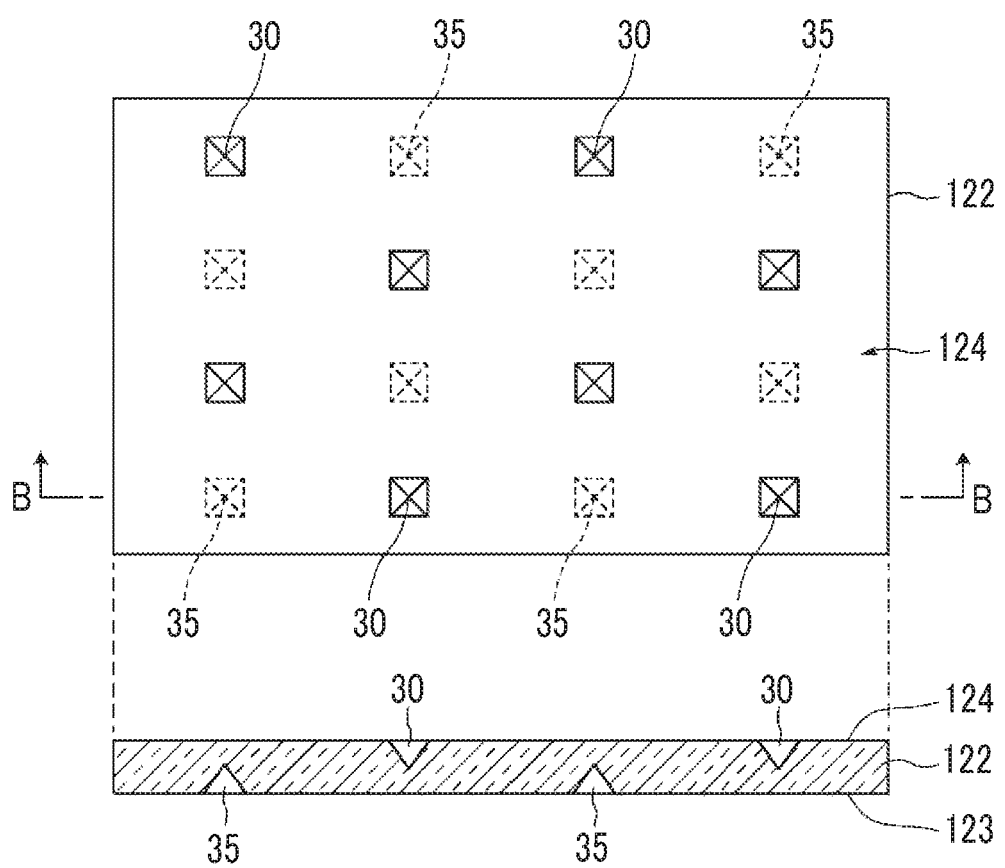
FIG. 4B is a schematic plan view and a schematic cross sectional view illustrating the layer of high refractive index in a design modification example.

FIG. 4B is a schematic plan view (upper view) and a schematic cross sectional view illustrating a layer of high refractive index 122 in a design modification example and a schematic cross sectional view (lower view) taken along the line B-B of the upper view.

As illustrated in FIG. 4B, together with comprising the light bending portions 30 in a light emission surface 124 of the layer of high refractive index 122, it is possible to comprise light bending portions 35 in a light incidence surface 123. It is preferable to comprise the light bending portions in the light emission surface by a half number or more of the total number of the light bending portions that are comprised in the light emission surface and the light incidence surface. In a case where the light incidence surface 123 and the light emission surface 124 of the layer of high refractive index 122 comprise the light bending portion, the proportion of the brightness homogenizing member of the area occupying the total of the light bending portion 30 with respect to the area of the emission surface is preferably 30% or more, more preferably 50% or more, and particularly preferably 80% or more.

Figure 5:
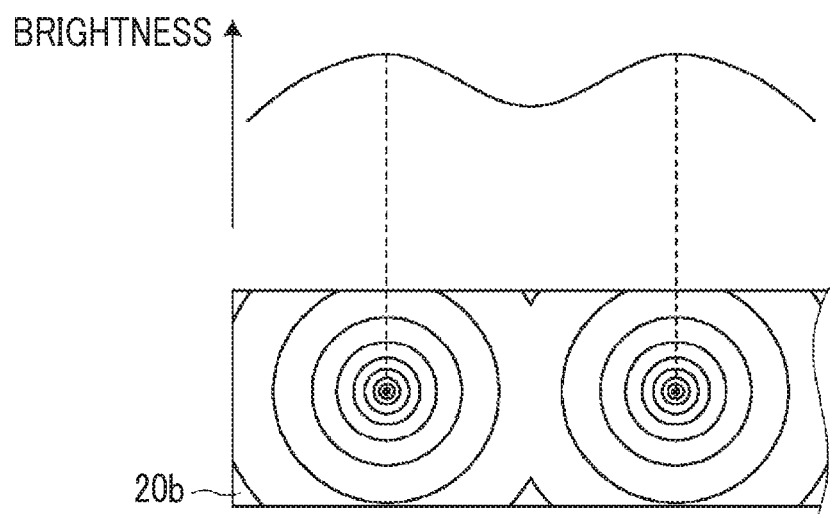
FIG. 5 is a diagram schematically illustrating brightness distribution in an emission surface of the backlight unit according to the first embodiment of the present invention.

FIG. 5 is a diagram schematically illustrating brightness distribution in an emission surface of the backlight unit 2 according to the first embodiment of the present invention, that is, the in-plane brightness distribution in the emission surface 20b of the brightness homogenizing member 20.

Figure 12:
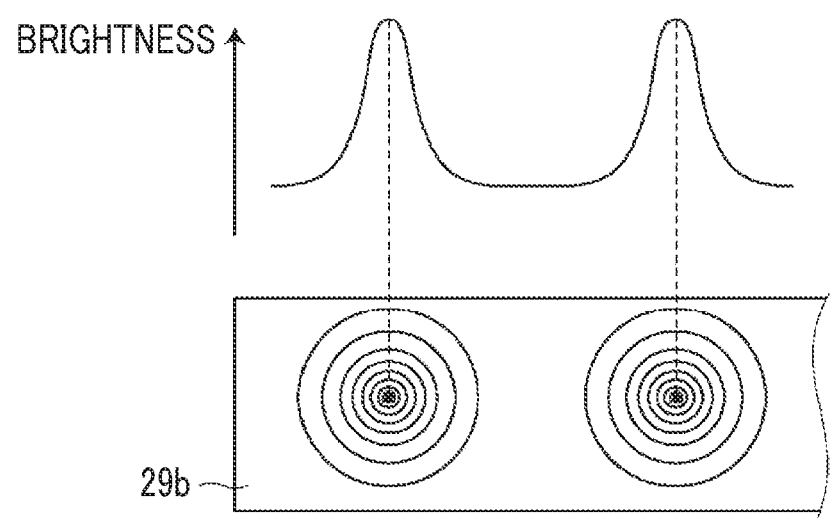
FIG. 12 is a diagram schematically illustrating brightness distribution in an emission surface of the backlight unit in the related art.

By comprising the brightness homogenizing member 20, the diffusion of the light in the brightness homogenizing member 20 in the in-plane direction is promoted, and the brightness peak in the point light source position can achieve the homogenization of the brightness in the plane compared with the brightness distribution in the diffusion plate surface of the backlight unit in the related art illustrated in FIG. 12.

Figure 6A:
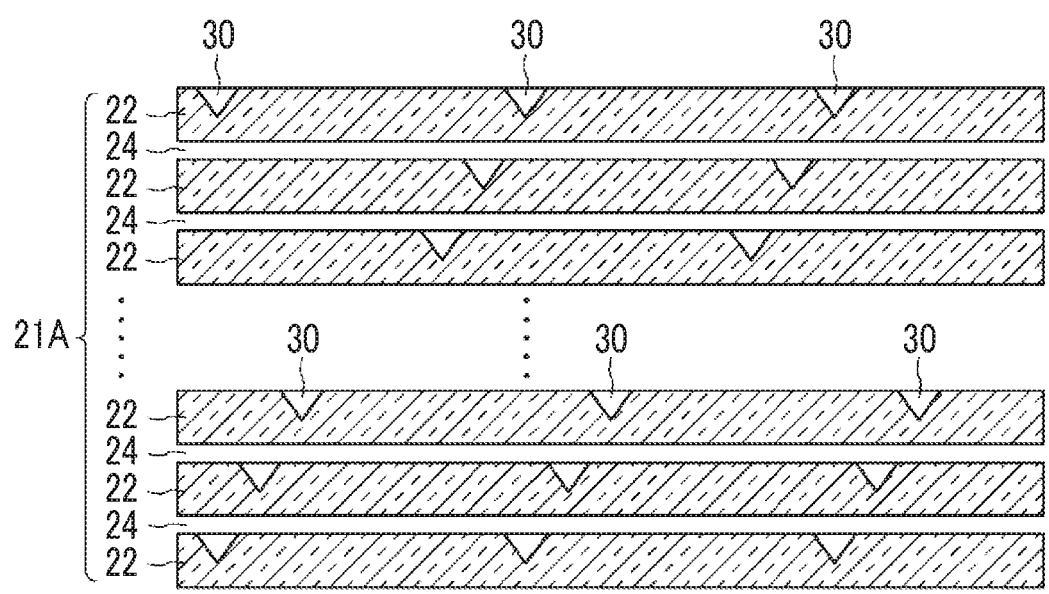
FIG. 6A is a schematic cross sectional view illustrating a brightness homogenizing member of Design Modification Example 1.

In the example illustrated in FIG. 1, the brightness homogenizing member 20 includes three layers of high refractive index 22, but in the lamination structure in which the layer of high refractive index 22 and the layer of low refractive index 24 are alternately laminated, at least two or more layers of high refractive index 22 may be included. As illustrated in the cross sectional schematic diagram of the brightness homogenizing member 21A of Design Modification Example 1 in FIG. 6A, the number of laminations of the layers of high refractive index 22 included in the lamination structure may be six or more. In order to achieve sufficient brightness homogenization without thickening the thickness of the brightness homogenizing member, it is preferable that the number of the layers of high refractive index is 3 to 10.

Figure 6B:
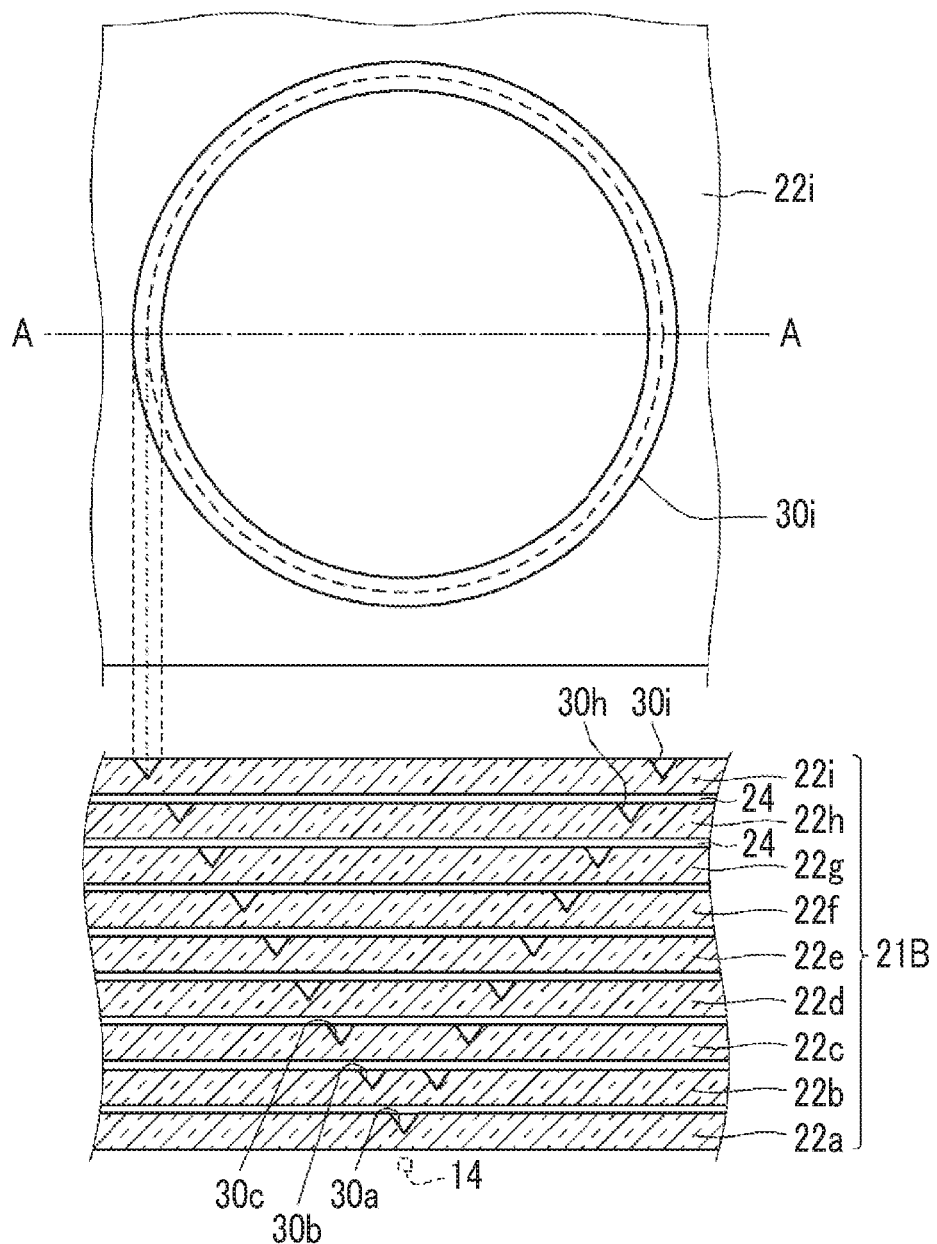
FIG. 6B is a schematic plan view and a schematic cross sectional view illustrating a brightness homogenizing member of Design Modification Example 2.

FIG. 6B is a schematic plan view (upper view) and a schematic cross sectional view (lower view) illustrating a brightness homogenizing member 21B of Design Modification Example 2. FIG. 6B illustrates a case where the brightness homogenizing member 21B has nine layers of high refractive index 22 (22a to 22i). In FIG. 6B, the schematic plan view shown in the upper view is the surface of the layer of high refractive index 22i on the most output surface side, and the schematic cross sectional view shown in the lower view is a cross sectional view taken along the line A-A in the schematic plan view. The brightness homogenizing member 21B has at least one concentric structure in which the layers of high refractive index having concentric light bending portions are laminated with the point light source 14 as the center toward emission side from the point light source 14. The layers of high refractive index 22a on the most point light source 14 side comprise the light bending portion 30a including a conical recessed part immediately above the point light source 14, and the layers of high refractive index 22b to 22i comprise concentric light bending portions 30b to 30i of which radiuses gradually increase as the layers disposed on the emission side. As illustrated, this concentric structure may be constituted by providing the concentric light bending portions 30b to 30i provided on the layers of high refractive index 22b to 22i as one continuous annular ring having an inverted triangular recessed part cross section or may be constituted by providing a plurality of light bending portions in dot shapes or the like, discretely in a ring shape. In addition to the illustrated light bending portion in a concentric structure with the point light source 14 as the center, in the brightness homogenizing members 21B, recessed part-like grooves having the same structure as the light bending portion on the outer periphery may be provided as light extraction portions. For example, in the outer peripheral portions of the light bending portions 30a to 30i, each of the layers of high refractive index comprises an annular groove that is concentric to the light bending portions 30a to 30i and has an inverted triangular recessed part cross section like the light bending portion on the light emission surface, in the same manner as in the light bending portion. As illustrated in FIG. 6C, it is preferable that a least a portion of the light extraction portion is provided on the light incidence surface side.

FIG. 6C is a schematic plan view (upper view) and a schematic cross sectional view (lower view) illustrating a brightness homogenizing member 21C of Design Modification Example 3. The brightness homogenizing member 21C of FIG. 6C comprises the light bending portion 30a including a conical recessed part immediately above the point light source 14 in the same manner as the brightness homogenizing member 21B with respect to each of the layers of high refractive index 122 (122a to 122i), and the layers of high refractive index 22b to 22i comprise the concentric light bending portions 30b to 30i of which radiuses gradually increase as much as the layers disposed on the emission side with the point light source 14 as the center. On the outer periphery of each of the light bending portions 30a to 30i constituting this concentric structure, each of the layers of the high refractive indexes 122a to 122i comprises concentric light extraction portions 36 (36a to 36i) on the light emission surface, and concentric light extraction portions 37 (37a to 37i) on the light incidence surface. The light extraction portions 36 and 37 provided on these outer peripheral portions mainly exhibit a function of effectively emitting light from the light emission surface.

As long as the light bending portion provided in the layer of high refractive index of the brightness homogenizing member exhibits a function of bending at least a portion of the light proceeding in the direction intersecting to the emission surface and causing the light to proceed in the direction in which the in-plane component parallel to the emission surface increases, the form thereof is not limited. Design Modification Examples 1 to 4 of the light bending portion are described with respect to FIGS. 7 to 10.

Figure 7:
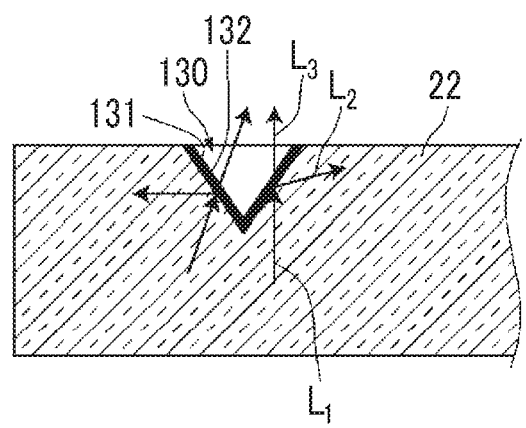
FIG. 7 is an enlarged cross sectional view illustrating Design Modification Example 1 of the light bending portion in the brightness homogenizing member.

In the same manner as the light bending portion 30 described above, the light bending portion 130 of Design Modification Example 1 illustrated in FIG. 7 has a quadrangular pyramidal recessed part provided on one surface of the layer of high refractive index 22, and a semi-transmissive reflective film 132 is provided on a surface 131 forming this recessed part. The semi-transmissive reflective film 132 can be constituted with a metal thin film, a cholesteric liquid crystal layer, or a dielectric multilayer film. At least a portion of the light $L_1$ that is incident on the light bending portion 130 and proceeds in the direction intersecting to the above emission surface 20b from the layer of high refractive index 22 to the surface 131 of the light bending portion 130 becomes the light $L_2$ that is reflected by an action of the semi-transmissive reflective film 132 and proceeds in the direction in which the in-plane component parallel to the emission surface increases. A portion of the light $L_1$ becomes the transmissive light $L_3$ that penetrates the semi-transmissive reflective film 132.

Figure 8:
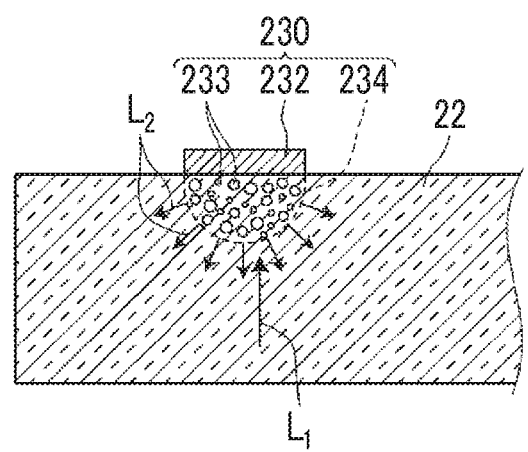
FIG. 8 is an enlarged cross sectional view illustrating Design Modification Example 2 of the light bending portion in the brightness homogenizing member.

A light bending portion 230 of Design Modification Example 2 illustrated in FIG. 8 includes a reflective film 232 provided along the surface of the layer of high refractive index 22 and a light scattering portion 234 in which scattering particles 233 are dispersed in a hemispherical region adjacent to the reflective film 232 of the layer of high refractive index 22. With respect to the light bending portion 230, the light $L_1$ that is incident from the layer of high refractive index 22 on the light bending portion 230 and proceeds in the direction intersecting to the emission surface 20b described above becomes light that is scattered in the light scattering portion 234, reflected by the reflective film 232, and further scattered in the light scattering portion 234, to become diffused light that spreads in a hemispherical shape from the light scattering portion 234, and at least a portion thereof becomes the light $L_2$ that proceeds in a direction in which the in-plane component parallel to the emission surface increases.

Figure 9:
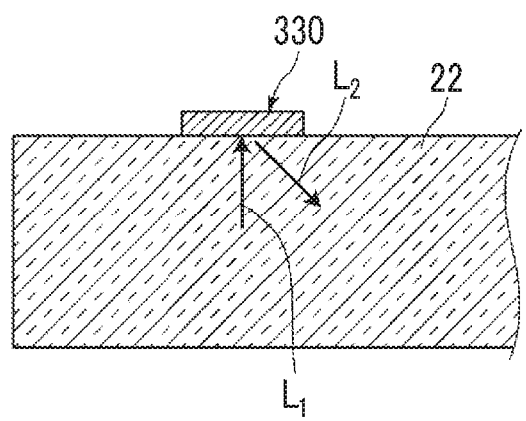
FIG. 9 is an enlarged cross sectional view illustrating Design Modification Example 3 of the light bending portion in the brightness homogenizing member.

A light bending portion 330 of Design Modification Example 3 illustrated in FIG. 9 is a reflective type diffraction lattice provided along the surface of the layer of high refractive index 22. The diffraction lattice is suitably a hologram diffraction lattice. The light $L_1$ that is incident to the light bending portion 330 from the layer of high refractive index 22 and proceeds in the direction of intersecting to the emission surface 20b becomes the light $L_2$ that proceeds in the direction in which the in-plane component parallel to the emission surface increases by a reflective interference action of the diffraction lattice.

The layer of high refractive index may further have a light scattering structure independently from the light bending portion inside or on the surface. In a case where the layer of high refractive index has a light scattering structure, the light spreading in the plane by the light bending portion scatters in the light scattering structure and can be emitted by the layer of high refractive index. The light scattering structure can be manufactured by arranging light scattering particles inside or on the surface of the layer of high refractive index or providing a fine uneven structure. It is preferable that the formation density of the light scattering structure is appropriately adjusted such that the balance between the amount of the light that spreads inside of the layer of high refractive index in the plane and the amount of the light that emits from the layer of high refractive index becomes appropriate.

All of the light bending portion and the light scattering structure may be randomly disposed in the layer of high refractive index, may be periodically disposed, or may be provided on the surface on the incident side in addition to the surface on the emission side. The light bending portion and the light scattering structure may be disposed so as to have a distribution structure in the plane. For example, in the arrangement of the point light source, it is preferable that the arrangement is performed such that the light bending portions in a portion immediately above the point light source or the light scattering structure becomes in a high density, because the in-plane brightness distribution in the emission surface 20b of the brightness homogenizing member 20 can be further improved.

For the purpose of causing light of a main light source to be evenly emitted to a predetermined region such as a square region or a circular region having a certain size with a point light source as a center, the light bending portion or the light scattering portion can be disposed so as to have a distribution structure in the plane of the layer of high refractive index 22. Accordingly, it is possible to control the emission amount of the light in a certain region so as to cause a display to have high contrast.

Figure 10:
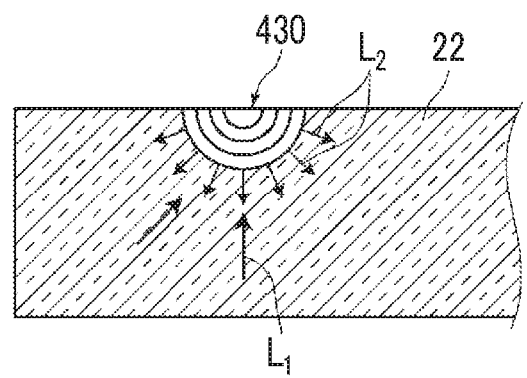
FIG. 10 is an enlarged cross sectional view illustrating Design Modification Example 4 of the light bending portion in the brightness homogenizing member.
Figure 11:
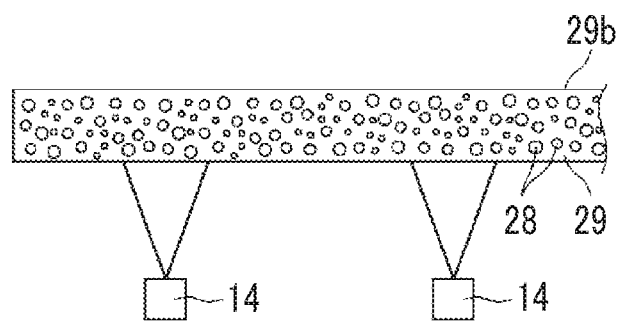
FIG. 11 is a diagram schematically illustrating a part of a backlight unit in the related art.

The light bending portion 430 of Design Modification Example 4 illustrated in FIG. 10 is a hemispherical dot (cholesteric liquid crystal dot) including a cholesteric liquid crystal provided in a portion of the layer of high refractive index 22 on the surface side. In this dot, the Grandjean alignment due to the cholesteric phase is formed along the arc of the hemisphere. The light $L_1$ that is incident on the light bending portion 430 from the layer of high refractive index 22 and proceeds in the direction of intersecting to the emission surface 20b becomes the light $L_2$ of which at least a portion proceeds in a direction in which the in-plane component parallel to the emission surface increases, by a reflection effect to a specific circularly polarized component in a specific wavelength range by a cholesteric liquid crystal.

All of the light bending portions 430 of Design Modification Examples 1 to 4 can achieve a brightness homogenization effect which is the same as that in the light bending portion 30 comprised in the brightness homogenizing member 20 of the first embodiment.

EXAMPLES

Hereinafter, the present invention is specifically described with reference to the examples. A material, an amount used, a ratio, a treatment detail, a treatment order, and the like provided below can be suitably changed without departing from the gist of the present invention. Other configuration can be adopted other than the following configurations without departing from the gist of the present invention.

Comparative Example 1

A polymethyl methacrylate resin transparent sheet having a thickness of 40 μm was used as Comparative Example 1. The present example is a configuration of only one transparent sheet corresponding to the layer of high refractive index. A liquid crystal cell is disposed as a member immediately above. In the subsequent evaluations, all members immediately above were set by using liquid crystal cells.

Comparative Example 2

43Z700X manufactured by Toshiba Corporation was disassembled, and a scattering sheet immediately above the light guide plate of the backlight was taken out, and was set as Comparative Example 2. The present example is a configuration of only one transparent sheet corresponding to the layer of high refractive index. As Comparative Example 2, a distance (a distance L in FIG. 1) from the upper surface of the light source to the member immediately above was set as 5 mm in the in-plane homogenization evaluation described below.

Comparative Example 3

A die for the prism sheet was prepared. A first die in which quadrangular pyramidal convexes in which a vertex angle was 60°, one side of the bottom square was 20 μm, and a height was 17 μm were uniformly formed, and a second die of which an opposite flat surface is formed of acryl so as to have a thickness of 40 μm based on tips of recessed parts formed by the convexes of the first die were prepared. The total area of the plurality of projections in the first die was 100% of the ratio of the planarly viewed area of the die. After the acrylic resin was formed by melt extrusion so as to be sandwiched between the two dies, the die was peeled off from the acrylic resin. The obtained acrylic sheet is a prism sheet in which a plurality of prisms were two-dimensionally arrayed and formed on the entire surface of one side. A prism sheet made of the acrylic resin was manufactured in this manner and was set as Comparative Example 3.

The prism sheet of Comparative Example 3 corresponds to the layer of high refractive index, and the prism corresponds to the light bending portion. The occupied area ratio of the light bending portion in one sheet was 100% of the sheet area.

Comparative Example 4

«Manufacturing of Diffusion sheet A1»

A first die in which quadrangular pyramidal convexes in which a vertex angle was 60°, one side of the bottom square was 20 μm, and a height was 17 μm occupy only 10% of the entire area, and a second die of which an opposite flat surface is formed of acryl so as to have a thickness of 40 μm based on tips of recessed parts formed by the convexes of the first die were prepared. Acrylic resin was applied by melting so as to be sandwiched between the two dies, and the die was peeled off from the acrylic resin after curing. The obtained acrylic sheet was a sheet in which square pyramidal recessed parts were formed on 10% of the entire area of one side. The quadrangular pyramidal recessed part functions as a light bending portion. The diffusion sheet A1 was manufactured in this manner.

The case where only one diffusion sheet A1 was used was set as Comparative Example 4.

Comparative Example 5

The distance L from the upper surface of the light source to the member immediately above was set as 20 mm in the brightness homogenization evaluation described below by using the scattering sheet of Comparative Example 2.

Comparative Example 6

In the brightness homogenization evaluation, the scattering sheet of Comparative Example 2 was used, the distance L from the upper surface of the light source to the member immediately above was set as 1.8 mm.

Example 1

«Manufacturing of Laminated Diffusion Sheet B1»
Three diffusion sheets A1 as the layer of high refractive index were laminated so as to obtain the laminated diffusion sheets B1. In a case of the lamination, a surface of the diffusion sheet A1 in which light bending portions including quadrangular pyramidal recessed parts were not formed was spin coated with a 5% ethanol dispersion liquid with silica sphere beads of 5 μm to function as a pillar, such that the laminated diffusion sheets were not completely closely attached to each other. That is, an air layer as a low refractive index layer was provided between the diffusion sheets A1. In a case of lamination, the layers were aligned by observation with the microscope such that the positions of the light bending portions were not overlapped with each other in the plane. Finally, end portions were fixed with an adhesive such that the positions are not deviated so as to manufacture the laminated diffusion sheet B1.

This laminated diffusion sheet B1 was set as the brightness homogenizing member of Example 1. In the brightness homogenizing member of Example 1, three sheets having a light bending portion occupying 10% of an area proportion with respect to the emission surface were laminated, and an occupied area proportion of the total light bending portion was 30%.

Example 2

«Manufacturing of Laminated Diffusion Sheet B2»
In the method of manufacturing the laminated diffusion sheet B1, a laminated diffusion sheet B2 was manufactured by the same method except that the number of the laminated sheets of the diffusion sheet A1 was 10.

This laminated diffusion sheet B2 was a brightness homogenizing member of Example 2. In the brightness homogenizing member of Example 2, 10 sheets having a light bending portion occupying 10% of an area proportion of the emission surface were laminated, and an occupied area proportion of the total light bending portion was 100%.

Example 3

«Manufacturing of Diffusion Sheet A11»
In the method of manufacturing the diffusion sheet A1, except that a first die in which convex shapes of the quadrangular pyramid occupied only 5% of the total area was used, a diffusion sheet A11 was manufactured by the same method as the diffusion sheet A1.

«Manufacturing of Laminated Diffusion Sheet B12»
In the method of manufacturing the laminated diffusion sheet B2, except that the diffusion sheet A1 was changed to the diffusion sheet A11, the laminated diffusion sheet B12 was manufactured in the same manner.

This laminated diffusion sheet B12 was set as the brightness homogenizing member of Example 3. In the brightness homogenizing member of Example 3, 10 sheets having a light bending portion occupying 5% of an area proportion of the emission surface were laminated, and an occupied area proportion of the total light bending portion was 50%.

Example 4

«Manufacturing of Diffusion Sheet A21»
In the manufacturing of the diffusion sheet A1, except that a first die in which convex shapes of the quadrangular pyramid occupied only 20% of the total area was used, a diffusion sheet A21 was manufactured by the same method as the diffusion sheet A1.

«Manufacturing of Laminated Diffusion Sheet B22»
In the manufacturing of the laminated diffusion sheet B2, except that the diffusion sheet A1 was changed to a diffusion sheet A21, a laminated diffusion sheet B22 was manufactured in the same manner.

This laminated diffusion sheet B22 was set as a brightness homogenizing member of Example 4. In the brightness homogenizing member of Example 4, five sheets having a light bending portion occupying 20% of an area proportion of the emission surface were laminated, and an occupied area proportion of the total light bending portion was 100%.

[Evaluation Method]
The brightness homogenizing members of the examples and respective sheets of comparative examples were disposed on the backlight obtained by disassembling 43Z700X manufactured by Toshiba Corporation, and a liquid crystal cell was disposed as a member immediately above the backlight viewing side. At this point, distances (the distance L in FIG. 1) from the upper surface of the light source of the backlight to the surface of the liquid crystal cell on the most backlight side were adjusted to be respectively distances presented in Table 1. Then, with the liquid crystal cell in a white display state, the brightness was measured from above the liquid crystal cell, and the in-plane uniformity was set as an evaluation index. BM-5A manufactured by Topcon Corporation was used for measurement of brightness. For the in-plane uniformity, the measured brightness was measured at 25 points of 5×5 at 1 cm pitch in the plane, and 3σ was calculated as the uniformity of the brightness. With 3σ as an index, brightness was divided into the following four steps to perform the evaluation. A and B are acceptable for use, but C and D are not acceptable.

<Evaluation Standard>
A: 3σ was less than 10%
B: 3σ was 10% or more and less than 30%
C: 3σ was 30% or more and less than 80%
D: 3σ was 80% or more The distance L was evaluated according to the following criteria as an index of thinning as follows. A and C are acceptable, but D is not acceptable.

<Evaluation Standard of Thinning>
A: L was less than 2 mm
B: L was 2 mm or more and less than 8 mm
C: L was 8 mm or more and less than 15 mm
D: L was 15 mm or more The configurations and evaluation results of Examples 1 to 4 and Comparative Examples 1 to 6 are collectively presented in Table 1.

TABLE 1

|  |  | Comparative Example 1 | Comparative Example 2 | Comparative Example 3 | Comparative Example 4 | Comparative Example 5 |
|---|---|---|---|---|---|---|
| Brightness homogenizing member | | Transparent sheet | Scattering sheet | Prism sheet | Diffusion sheet A1 | Scattering sheet |
| Configuration | Sheet constituting layer of high refractive index | Transparent sheet | Scattering sheet | Prism sheet | Diffusion sheet A1 | Scattering sheet |
| | Number of laminated sheet | 1 | 1 | 1 | 1 | 1 |
| | Layer of low refractive index | — | — | — | — | — |
| | Light bending portion Presence/Non presence | Not present | Present | Present | Present | Present |
| | Shape (Form) | — | Scattering particle | Quad-rangular pyramidal shape | Quad-rangular pyramidal recessed part | Scattering particle |
| | Occupied area proportion in a case of being planarly viewed/one sheet | — | 100% | 100% | 10% | 100% |
| | Occupied area proportion in a case of being planarly viewed/Lamination structure | — | 100% | 100% | 10% | 100% |
| | Distance from upper surface of light source to member immediately above backlight unit (distance L in FIG. 1) [mm] | 20.0 | 5.0 | 1.8 | 0.16 | 20.0 |
| Effect | In-plane uniformity | D | C | C | C | B |
| | Thinning | D | B | A | A | D |

|  |  | Comparative Example 6 | Example 1 | Example 2 | Example 3 | Example 4 |
|---|---|---|---|---|---|---|
| Brightness homogenizing member | | Scattering sheet | Laminated diffusion sheet B1 | Laminated diffusion sheet B2 | Laminated diffusion sheet B12 | Laminated diffusion sheet B22 |
| Configuration | Sheet constituting layer of high refractive index | Scattering sheet | Diffusion sheet A1 | Diffusion sheet A1 | Diffusion sheet A11 | Diffusion sheet A21 |
| | Number of laminated sheet | 1 | 3 | 10 | 10 | 5 |
| | Layer of low refractive index | — | Air layer | Air layer | Air layer | Air layer |
| | Light bending portion Presence/Non presence | Present | Present | Present | Present | Present |
| | Shape (Form) | Scattering particle | Quad-rangular pyramidal recessed part | Quad-rangular pyramidal recessed part | Quad-rangular pyramidal recessed part | Quad-rangular pyramidal recessed part |
| | Occupied area proportion in a case of being planarly viewed/one sheet | 100% | 10% | 10% | 5% | 20% |
| | Occupied area proportion in a case of being planarly viewed/Lamination structure | 100% | 30% | 100% | 50% | 100% |
| | Distance from upper surface of light source to member immediately above backlight unit (distance L in FIG. 1) [mm] | 1.8 | 0.28 | 0.70 | 0.70 | 0.40 |
| Effect | In-plane uniformity | D | B | A | B | B |
| | Thinning | A | A | A | A | A |

As presented in Table 1, in Examples 1 to 4, the in-plane brightness homogenized compared with Comparative Examples 1 to 4 were obtained.

In a case of comprising the brightness homogenizing members of the examples, the uniformity of the in-plane brightness in the light emission surface of the backlight unit was able to be increased, thus a gap between the backlight unit and the liquid crystal panel in a case of being incorporated with the liquid crystal display device was able to be caused to be small, and as a result, it was possible to thin the liquid crystal display device.

As in Comparative Example 5, it was found that the effect of in-plane uniformity was able to be obtained only with the scattering sheet by setting L to increase than that in Comparative Example 2, but in this case, the thinning was not able to be realized. As in Comparative Example 6, it was found that, in a case where L was set to be smaller than that in Comparative Example 2, the effect of the in-plane uniformity by the scattering sheet further decreased.

Meanwhile, in Examples 1 to 4, thinning was able to be sufficiently realized, and also satisfactory in-plane uniformity was able to be obtained.

Subsequently, based on Example 2, Examples 10 to 14 in which disposition of the light bending portion and constitution of the light bending portion were changed were manufactured, and comparative evaluation with Example 2 was performed.

Example 10

The number of the quadrangular pyramidal recessed parts in the light bending portion of Example 2 was divided into halves so as to be uniformly distributed in the plane on the surface on the emission side and the surface on the incidence side. Others were constituted in the same manner as Example 2. Specifically, the brightness homogenizing member of Example 10 was obtained as described below.

«Manufacturing of Diffusion Sheet A3»

A first die in which quadrangular pyramidal convexes in which a vertex angle was 60°, one side of the bottom square was 20 μm, and a height was 17 μm occupy only 5% of the entire area, and a second die of which an opposite flat surface is formed of acryl so as to have a thickness of 40 μm based on tips of recessed parts formed by the convexes of the first die and simultaneously in which convexes having the same shape as the convexes of the first die were provided in 5% of the entire area at positions different from those of protrusions of the first die were prepared. Acryl was applied by melting so as to be sandwiched between the two dies, and the die was peeled off from the acryl after curing. The acrylic sheet obtained after the curing became a sheet as illustrated in FIG. 4B, in which a light bending portion including quadrangular pyramidal recessed parts was formed on 5% of the area of one side, on each side. A diffusion sheet A3 was manufactured in this manner.

«Manufacturing of Laminated Diffusion Sheet B3»

In the method of manufacturing a laminated diffusion sheet B2, a laminated diffusion sheet B3 was manufactured in the same manner except that the diffusion sheet A3 was substituted with the diffusion sheet A1.

This laminated diffusion sheet B3 was used as the brightness homogenizing member of Example 10. In the brightness homogenizing member of Example 10, by the light bending portion including the light incidence surface and the light emission surface, 10 diffusion sheets A3 occupying 10% of an area proportion of the emission surface of the brightness homogenizing member were laminated, and an occupied area proportion of the total light bending portion was 100%.

Example 11

The quadrangular pyramidal recessed parts that constitute light the bending portions of the diffusion sheet A1 of Example 2 were filled with a premix-type white diffusion reflection coating agent manufactured by Edmund Optics Inc. as a light reflection and light scattering material, so as to manufacture a diffusion sheet A1-11. The laminated diffusion sheet B2-11 was manufactured by the same method as in Example 2 except that the diffusion sheet A1-11 was used instead of the diffusion sheet A1, so as to obtain a brightness homogenizing member of Example 11.

Example 12

The quadrangular pyramidal recessed parts that constitute the light bending portions of the diffusion sheet A1 of Example 2 were filled with a cholesteric liquid crystal material as the light reflection and light scattering material, so as to manufacture a diffusion sheet A1-12. As the cholesteric liquid crystal material, a material disclosed in pages 60 to 63 of Fujifilm Research Report No. 50 (2005). The chiral agent used was adjusted such that the central wavelength of selective reflection was 550 nm. A laminated diffusion sheet B2-12 was manufactured by the same method as in Example 2 except that the diffusion sheet A1-12 was used instead of the diffusion sheet A1, so as to obtain a brightness homogenizing member of Example 12.

Example 13

Quadrangular pyramidal recessed parts that constitute the light bending portion of the diffusion sheet A1 of Example 2 were filled with a silver mirror ink agent as a light reflection and light scattering material, so as to manufacture a diffusion sheet A1-13. As a silver mirror ink agent, a complex silver mirror coating ink manufactured by InkTec Co., Ltd. (model number: TEC-CO-021) was used, and quadrangular pyramidal recessed parts were filled with this ink, and the ink was dried at 80° C. for 20 minutes. The laminated diffusion sheet B2-13 was manufactured by the same method as in Example 2 except that the diffusion sheet A1-13 was used instead of the diffusion sheet A1, so as to obtain a brightness homogenizing member of Example 13.

Example 14

A reflection layer including a white material and a metal laminate was formed in quadrangular pyramidal recessed parts that constitute the light bending portion of the diffusion sheet A1 of Example 2, so as to manufacture a diffusion sheet A1-14. In a case where a laminate including a white material and a metal laminate was used, it is possible to form a reflector exhibiting satisfactory reflection characteristics even in a case of being a thin layer. The reflection layer including a white material and a metal laminate is formed with reference to Example 11 of JP2014-078218A. The surface of the recessed part was coated with a coating solution for coloring (white material) disclosed in [0132] of JP2014-078218A such that an average dry film thickness was 5.1 μm and the coating solution was dried at 100° C. for 10 minutes, then a portion other than the recessed parts was masked, and an Ag thin film having a thickness of 200 nm was formed only on recessed parts by a method disclosed in [0184] of JP2014-078218A. Thereafter, the recessed parts were further coated with the coating solution for coloring such that an average dry film thickness was 5.1 μm, and the coating solution was dried at 100° C. for 10 minutes, so as to manufacture a diffusion sheet A1-14 having a reflection layer obtained by laminating three layers of a white material, a metal thin film, and a white material on the recessed parts.

A laminated diffusion sheet B2-14 was manufactured by the same method as Example 2 except that the diffusion sheet A1-14 was used instead of the diffusion sheet A1, so as to obtain a brightness homogenizing member of Example 14.

[Evaluation Method]

With respect to Examples 10 to 14, the in-plane uniformity, the thinning, and the brightness average value were evaluated. The methods of evaluating the in-plane uniformity and the thinning were the same as those described above. The brightness average value was calculated by measuring brightness measured by using BM-5A manufactured by Topcon Corporation, at 25 points of 5×5 at 1 cm pitch in the plane and obtaining the arithmetic mean. A value $(I_n/I_2) \times 100(\%)$ obtained by dividing brightness average values $I_n$ of Examples 10 to 14 with brightness average values $I_2$ of Example 2 was obtained as a relative average value and evaluated as follows.

<Evaluation Standard>

A: 150% or more

B: 100 to 150%

C: Less than 100%

The configurations and the evaluation results of Examples 10 to 14 are collectively presented in Table 2. Example 2 as standards is also presented in Table 2.

TABLE 2

|  |  | Example 2 | Example 10 | Example 11 |
|---|---|---|---|---|
| Brightness homogenizing member | | Laminated diffusion sheet B2 | Laminated diffusion sheet B3 | Laminated diffusion sheet B2-11 |
| Configuration | Scattering sheet | A1 | A3 | A1-11 |
| | Shape (Form) of light bending portion | Quadrangular pyramidal recessed part | Quadrangular pyramidal recessed parts uniformly distributed on light incidence/emission surface | Quadrangular pyramidal recessed parts White diffusion reflection coating agent |
| Effect | In-plane uniformity | A | A | A |
| | Thinning | A | A | A |
| | Brightness average value evaluation | Reference | B | A |
|  |  | Example 12 | Example 13 | Example 14 |
| Brightness homogenizing member | | Laminated diffusion sheet B2-12 | Laminated diffusion sheet B2-13 | Laminated diffusion sheet B2-14 |
| Configuration | Scattering sheet | A1-12 | A1-13 | A1-14 |
| | Shape (Form) of light bending portion | Quadrangular pyramidal recessed parts Cholesteric liquid crystal material | Quadrangular pyramidal recessed parts Silver mirror ink agent | Quadrangular pyramidal recessed parts Laminated reflection layer of white material and metal thin film |
| Effect | In-plane uniformity | A | A | A |
| | Thinning | A | A | A |
| | Brightness average value evaluation | B | A | A |

The thickness was the same as Example 2, and thus all were evaluated the same. All the in-plane uniformity was satisfactory in the same manner. All of the brightness average values of Examples 10 to 14 were more than that of Example 2, and brightness was improved. With respect to the light bending portion, it was found that the brightness improvement effect was excellent in the configuration in which the recessed parts were filled with the light reflection and light scattering material as in Examples 11 to 14 than in the configuration in which the recessed parts were simply provided as in Example 2.

Subsequently, Examples 20 to 25 including the light bending portion of the concentric structure as illustrated in FIGS. 6B and 6C were manufactured to perform evaluation.

Example 20

«Manufacturing of Diffusion Sheet Group C1»

A die for a concentric structure bending portion in order to realize the configuration illustrated in FIG. 6B was prepared. A first die in which convexes with triangular cross sections in which a vertex angle was 60°, one side of the bottom square was 20 μm, and a height was 17 μm were formed in a cyclic shape having a radius $r_i$, and a second die of which an opposite flat surface is formed of acryl so as to have a thickness of 40 μm based on tips of recessed parts formed by the convexes of the first die were prepared. The first die has a configuration in which the cyclic convex and the concentric cyclic convex of the radius $r_i$ is further comprised on the outer side of the cyclic convex for the concentric structure bending portion illustrated in FIG. 6B, that is, the convex for the light bending portion as the convex for the light extraction portion.

After the acrylic resin was formed by melt extrusion so as to be sandwiched between the two dies, the die was peeled off from the acrylic resin. In this manner, a diffusion sheet C19 comprising the light bending portions 30$i$ having recessed parts with inverted triangular cross sections as illustrated in the layer of high refractive index 22$i$ of FIG. 6B and light extraction recessed parts on the outer periphery thereof as a light extraction portion was manufactured. In the same manner, diffusion sheets C11 to 18 having cyclic light bending portions of the diffusion sheet C19 and concentric light bending portions having different radiuses and having cyclic light extraction portions on the outer periphery of the light bending portions thereof were manufactured. The smallest radius of the concentric structure bending portions was zero, and as illustrated in the layer of high refractive index 22$a$ of FIG. 6B, light bending portions having conical recessed part structure were obtained. With respect to light extraction grooves provided in the respective sheets C11 to C19, the radius of the grooves set randomly under the condition that the density increased as the distance from the center of the circle increased and as the sheet closer to the light source increased.

In this manner, a diffusion sheet group C1 including the diffusion sheets C11 to 19 was manufactured.

«Manufacturing of Laminated Diffusion Sheet D1»

In a case of laminating the diffusion sheets C11 to C19, the surface of each sheet on which the concave groove was not formed was spin coated with a 5% ethanol dispersion liquid with silica sphere beads of 5 μm to function as a pillar, such that the laminated diffusion sheets were not completely closely attached to each other. That is, an air layer was provided between the diffusion sheets A1 as the layer of low refractive index. In a case of lamination, nine layers were laminated by aligning the layers by observation with the microscope such that the centers of concentric circles overlap with each other. Finally, end portions were fixed with an adhesive such that the positions are not deviated so as to manufacture a laminated diffusion sheet D1.

The laminated diffusion sheet D1 was set as the brightness homogenizing member of Example 20. An occupied area proportion of the total light bending portion of the brightness homogenizing member of Example 20 was 100%.

Example 21

Diffusion sheets C21 to 29 in which the light extraction grooves of the diffusion sheets C11 to C19 of Example 20 were divided into half and disposed on the emission side surface and the incidence side surface were manufactured as a diffusion sheet group C2. The diffusion sheets C21 to 29 had configurations of the layers of high refractive index 122a to 122i as illustrated in FIG. 6C. A laminated diffusion sheet D2 was manufactured in the same method as in Example 20 except that the diffusion sheet group C2 was used instead of the diffusion sheet group C1, so as to obtain a brightness homogenizing member of Example 21.

Example 22

Annular recessed parts having inverted triangular recessed part cross sections that constitute the light bending portions of the respective sheets C11 to C19 of the diffusion sheet group C1 of Example 20 were filled with a premix-type white diffusion reflection coating agent manufactured by Edmund Optics Inc. as a light reflection and light scattering material, so as to manufacture a diffusion sheet group C1-22. The coating was not applied to the light extraction portion provided on the outer periphery. A laminated diffusion sheet D1-22 was manufactured by the same method as in Example 20 except that the diffusion sheet group C1-22 was used instead of the diffusion sheet group C1, so as to obtain a brightness homogenizing member of Example 22.

Example 23

Annular recessed parts having inverted triangular recessed part cross sections that constitute the light bending portions of the respective sheets C11 to C19 of the diffusion sheet group C1 of Example 20 were filled with a cholesteric liquid crystal material as a light reflection and light scattering material, so as to manufacture a diffusion sheet group C3. As the cholesteric liquid crystal material, a material disclosed in pages 60 to 63 of Fujifilm Research Report No. 50 (2005). The chiral agent used was adjusted such that the central wavelength of selective reflection was 550 nm. A laminated diffusion sheet D1-23 was manufactured by the same method as in Example 20 except that the diffusion sheet group C3 was used instead of the diffusion sheet group C1, so as to obtain a brightness homogenizing member of Example 23.

Example 24

Annular recessed parts having inverted triangular recessed part cross sections that constitute the light bending portions of the respective sheets C11 to C19 of the diffusion sheet group C1 of Example 20 were filled with a silver mirror ink agent as a light reflection and light scattering material, so as to manufacture a diffusion sheet group C1-24. As a silver mirror ink agent, a complex silver mirror coating ink manufactured by InkTec Co., Ltd. (model number: TEC-CO-021) was used, and the recessed part were filled with this ink, and the ink was dried at 80° C. for 20 minutes. A laminated diffusion sheet D1-24 was manufactured by the same method as in Example 20 except that the diffusion sheet group C1-24 was used instead of the diffusion sheet group C1, so as to obtain a brightness homogenizing member of Example 24.

Example 25

A reflection layer including a white material and a metal laminate was formed in annular recessed parts having inverted triangular recessed part cross sections that constitute the light bending portions of the respective sheets C11 to C19 of the diffusion sheet group C1 of Example 20, as the light reflection and light scattering material, so as to manufacture a diffusion sheet C1-25. The method of forming the reflection layer including the white material and the metal laminate is the same as Example 14.

A laminated diffusion sheet D1-25 was manufactured in the same method as in Example 20 except that the diffusion sheet group C1-25 was used instead of the diffusion sheet group C1, so as to obtain a brightness homogenizing member of Example 25.

[Evaluation]

After a cap of one LED of the backlights obtained by disassembling 43Z700X manufactured by Toshiba Corporation was removed to expose the LED, ultrafine foamed light reflective plate MCPET (model number S4) of Furukawa Electric Co., Ltd. with a pinhole having a diameter of 50 μm opened was disposed such that a pinhole thereof was placed immediately above the LED light emitting portion, so as to manufacture a point light source.

In Examples 20 to 25, the brightness equalizing member of each example was disposed such that the center of the concentric circle having a concentric structure thereof was positioned immediately above the point light source, so as to evaluate the in-plane uniformity, the thinning, and the brightness average value.

The method of evaluating the in-plane uniformity and the thinning was performed in the same method as described above. The brightness average value was also obtained in the same method as described above. However, a value obtained by dividing the brightness average values of Examples 21 to 25 with the brightness average value of Example 20 was obtained as a relative average value, and evaluated as follows.

<Evaluation Standard>
A: 150% or more
B: 100 to 150%
C: Less than 100%

The configurations and the evaluation results of Examples 20 to 25 are collectively presented in Table 3.

TABLE 3

|  |  | Example 20 | Example 21 | Example 22 |
|---|---|---|---|---|
| Brightness homogenizing member |  | Laminated diffusion sheet D1 | Laminated diffusion sheet D2 | Laminated diffusion sheet D1-22 |
| Configuration | Scattering sheet group | C1 | C2 | C1-22 |
|  | Shape (Form) of light bending portion | Quadrangular pyramidal recessed part | Quadrangular pyramidal recessed parts uniformly distributed on light incidence/emission surface | Quadrangular pyramidal recessed parts White diffusion reflection coating agent |
| Effect | In-plane uniformity | A | A | A |
|  | Thinning | A | A | A |

TABLE 3-continued

| Brightness average value evaluation | Reference | B | A |
|---|---|---|---|
| | Example 23 | Example 24 | Example 25 |
| Brightness homogenizing member | Laminated diffusion sheet D1-23 | Laminated diffusion sheet D1-24 | Laminated diffusion sheet D1-25 |
| Configuration Scattering sheet group | C1-23 | C1-24 | C1-25 |
| Shape (Form) of light bending portion | Quadrangular pyramidal recessed parts Cholesteric liquid crystal material | Quadrangular pyramidal recessed parts Silver mirror ink agent | Quadrangular pyramidal recessed parts Laminated reflection layer of white material and metal thin film |
| Effect In-plane uniformity | A | A | A |
| Thinning | A | A | A |
| Brightness average value evaluation | B | A | A |

The thickness was the same in Examples 20 to 25, and thus all were evaluated the same. All the in-plane uniformity was satisfactory in the same manner. All the brightness average values of Examples 21 to 25 were more than the brightness average value of Example 20, and the brightness was improved. With respect to the light bending portion, it was found that the brightness improvement effect was excellent in the configuration in which the recessed parts were filled with the light reflection and light scattering material as in Examples 22 to 25 than in the configuration in which the recessed parts were simply provided as in Example 20.

EXPLANATION OF REFERENCES

1: liquid crystal display device
2: backlight unit
10: plane light source
12: reflective plate
13: side wall
14: point light source (LED)
20, 21A, 21B, 21C: brightness homogenizing member
20a: incidence surface
20b: emission surface
22, 22a to 22i: layer of high refractive index (diffusion sheet)
24: layer of low refractive index (air layer)
26: spacer
28: scattering particle
29: light diffusion plate
29b: light emission surface of light diffusion plate
30, 30a to 30i, 130: light bending portion
31, 131: surface constituting light bending portion
36, 36a to 36i, 37, 37a to 37i: light extraction portion
40: liquid crystal display element
122, 122a, 122b, 122c . . . : layer of high refractive index (diffusion sheet)
123: light incidence surface of the layer of high refractive index 122
124: light emission surface of the layer of high refractive index 122
132: semi-transmissive reflective film
230, 330, 430: light bending portion
232: reflective film
233: scattering particle
234: light scattering portion

What is claimed is:

1. A brightness homogenizing member comprising:
an incidence surface on which light from a plane light source is incident; and
an emission surface that is at an opposite side of the brightness homogenizing member from the incidence surface, and that emits light, wherein:
the brightness homogenizing member homogenizes brightness of the light from the plane light source and emits the light,
the brightness homogenizing member has a lamination structure in which layers of high refractive index having a relatively high refractive index and layers of low refractive index having a relatively low refractive index are alternately laminated in a direction perpendicular to the emission surface,
each of a plurality of the layers of high refractive index includes, on a surface on an emission surface side, a light bending portion that bends at least a portion of light proceeding in a direction intersecting the emission surface and causes the light to proceed in a direction in which an in-plane component parallel to the emission surface increases,
in a case in which where the lamination structure is planarly viewed from a lamination direction in the lamination structure, the light bending portions are provided in different positions between the plurality of the layers of high refractive index,
each layer of the plurality of the layers of high refractive index includes a plurality of the light bending portions, and
in a case of being planarly viewed, a sum of areas occupied by all of the light bending portions in each layer is 5% to 20% of an area of the emission surface.

2. The brightness homogenizing member according to claim 1,
wherein, in a case of being planarly viewed, an area occupied by the light bending portions existing in the lamination structure is 30% or more of an area of the emission surface.

3. The brightness homogenizing member according to claim 1,
wherein the light bending portion is constituted with a reflective surface provided not parallel to the emission surface.

4. The brightness homogenizing member according to claim 1, wherein the light bending portion includes a hemispherical, conical, or polygonal pyramidal recessed part provided on the emission surface side of the layer of high refractive index.

5. The brightness homogenizing member according to claim 1,
wherein the light bending portion includes a reflective surface provided on a surface on the emission surface side and a light scattering portion provided adjacent to the reflective surface.

6. The brightness homogenizing member according to claim 1,
wherein the light bending portion includes a cholesteric liquid crystal dot provided on a surface on the emission surface side.

7. The brightness homogenizing member according to claim 1,
wherein the light bending portion is a diffraction lattice provided on a surface on the emission surface side.

8. A backlight unit comprising:
a plane light source; and
the brightness homogenizing member according to claim 1, which is disposed on a light emission surface side of the plane light source.

9. The backlight unit according to claim 8, wherein:
the plane light source includes a plurality of point light sources two-dimensionally arranged, and
light from the point light sources is directly incident on the incidence surface of the brightness homogenizing member.

10. A liquid crystal display device comprising:
a liquid crystal display element; and
the backlight unit according to claim 8.

11. A liquid crystal display device comprising:
a liquid crystal display element; and
the backlight unit according to claim 9.

* * * * *